(12) United States Patent
Kingston

(10) Patent No.: US 6,194,081 B1
(45) Date of Patent: *Feb. 27, 2001

(54) BETA TITANIUM-COMPOSITE LAMINATE

(75) Inventor: William R. Kingston, Chino Hills, CA (US)

(73) Assignee: Ticomp. Inc., Chino Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/247,647

(22) Filed: Feb. 9, 1999

Related U.S. Application Data

(63) Continuation-in-part of application No. 08/982,779, filed on Dec. 2, 1997, now Pat. No. 5,906,550, which is a continuation-in-part of application No. 08/690,801, filed on Aug. 1, 1996, now Pat. No. 5,693,157, which is a division of application No. 08/588,868, filed on Jan. 16, 1996, now Pat. No. 5,578,384, which is a continuation of application No. 08/568,530, filed on Dec. 7, 1995, now Pat. No. 5,733,390, which is a continuation of application No. 08/139,091, filed on Oct. 18, 1993, now abandoned.

(51) Int. Cl.$^7$ .............................. B32B 5/02; B32B 15/04; C09J 5/02

(52) U.S. Cl. .......................... 428/608; 428/634; 428/626; 428/660; 428/670; 428/416; 428/418; 428/229.1; 156/307.7; 156/307.3

(58) Field of Search .................................. 428/608, 457, 428/622, 626, 634, 635, 614, 660, 670, 299.1, 299.4, 301.1, 301.4, 416, 418; 156/153, 281, 330, 307.7, 306.6, 306.9, 295, 314, 315, 307.3; 427/388.1, 376.8; 148/421, 516, 518, 537, 670, 527

(56) References Cited

U.S. PATENT DOCUMENTS

| | | | |
|---|---|---|---|
| 3,758,234 | * | 9/1973 | Goodwin .............................. 428/608 |
| 3,888,661 | * | 6/1975 | Levitt et al. ......................... 428/608 |
| 3,936,277 | * | 2/1976 | Jakway et al. ....................... 428/608 |
| 3,991,928 | * | 11/1976 | Friedrich et al. .................... 228/190 |

(List continued on next page.)

OTHER PUBLICATIONS

NASA CR–1859, "Analytical and Experimental Investigation of Aircraft Metal Structures Reinforced with Filamentary Composites–Phase I–Concept Development and Feasibility", S. Oken and R.R. Jun., 129 pages, 1969–1970.*

NASA Cr–2039, "Analytical and Experimental Investigation of Aircraft Metal Structures Reinforced with Filamentary Composites–PhaseII–Structural Fatigue, Thermal Cycling Creep, and Residual Strength", B. Blichfeldt and J.E. McCarty, 111 pages, (No Month), 1969–1970.*

Primary Examiner—John J. Zimmerman
(74) Attorney, Agent, or Firm—David A. Farah; Sheldon & Mak

(57) ABSTRACT

A method of preparing a beta titanium-composite laminate comprising providing a first layer of beta titanium alloy having a yield strength to modulus of elasticity ratio and adhering a first layer of composite having a strength to modulus of elasticity ratio to the layer of beta titanium alloy, thereby forming a beta titanium-composite laminate, where the yield strength to modulus of elasticity ratio of the first layer of beta titanium alloy matches the strength to modulus of elasticity ratio of the first layer of composite such that the first layer of beta titanium alloy will reach its stress limit and the first layer of composite will reach its stress limits at about the same total strain. Also, a beta titanium-composite laminate comprising a first layer of beta titanium alloy having a yield strength to modulus of elasticity ratio, and a first layer of composite having a strength to modulus of elasticity ratio adhered to the first layer of beta titanium alloy, where the yield strength to modulus of elasticity ratio of the first layer of beta titanium alloy matches the strength to modulus of elasticity ratio of the first layer of composite such that the first layer of beta titanium alloy will reach its stress limit and the first layer of composite will reach its stress limits at about the same total strain. Further, a structure such as an airplane part including a beta titanium-composite laminate according to the present invention.

33 Claims, 3 Drawing Sheets

U.S. PATENT DOCUMENTS

| | | | |
|---|---|---|---|
| 4,029,838 | * | 6/1977 | Chamis et al. ............... 428/301 |
| 4,115,611 | * | 9/1978 | Stoltze et al. ............... 428/608 |
| 4,132,828 | * | 1/1979 | Nakamura et al. ............ 428/608 |
| 4,137,370 | | 1/1979 | Fujishiro et al. ............. 428/660 |
| 4,141,802 | * | 2/1979 | Duparque et al. ............ 428/608 |
| 4,356,678 | * | 11/1982 | Andrews et al. ............... 52/799 |
| 4,411,380 | * | 10/1983 | McWithey et al. ............ 228/181 |
| 4,473,446 | * | 9/1984 | Locke et al. ................ 24/32.1 |
| 4,489,123 | | 12/1984 | Schijve et al. ............... 428/213 |
| 4,500,589 | | 2/1985 | Schijve et al. ............... 428/213 |
| 4,624,897 | | 11/1986 | Ito ............................... 428/432 |
| 4,753,850 | * | 6/1988 | Ibe et al. ...................... 428/608 |
| 4,775,602 | | 10/1988 | Rasch .......................... 428/668 |
| 4,777,098 | | 10/1988 | Takamura et al. ............ 428/664 |
| 4,816,347 | | 3/1989 | Rosenthal et al. ............ 428/615 |
| 4,917,968 | | 4/1990 | Tuffias et al. ................ 428/621 |
| 4,935,291 | | 6/1990 | Gunnink ...................... 428/213 |
| 4,956,026 | | 9/1990 | Bell ............................. 148/127 |
| 4,992,323 | | 2/1991 | Vogelesang et al. .......... 428/215 |
| 5,006,419 | | 4/1991 | Grunke et al. ................ 428/623 |
| 5,008,157 | | 4/1991 | Paxos .......................... 428/612 |
| 5,009,966 | | 4/1991 | Garg et al. .................... 428/627 |
| 5,039,571 | | 8/1991 | Vogelsang et al. ........... 428/213 |
| 5,076,875 | | 12/1991 | Padden ........................ 457/304 |
| 5,079,101 | | 1/1992 | Murayama ................... 528/623 |
| 5,100,737 | | 3/1992 | Colombier et al. ........... 428/612 |
| 5,104,460 | | 4/1992 | Smith, Jr. et al. ............ 148/11.5 F |
| 5,122,422 | | 6/1992 | Rodhammer et al. ......... 428/634 |
| 5,160,771 | | 11/1992 | Lambing et al. ............. 428/57 |
| 5,200,004 | | 4/1993 | Verhoeven et al. ........... 148/527 |
| 5,213,904 | | 5/1993 | Banker ........................ 428/651 |
| 5,215,832 | | 6/1993 | Hughes et al. ............... 428/623 |
| 5,232,525 | | 8/1993 | Smith et al. ................. 148/514 |
| 5,242,759 | | 9/1993 | Hall ............................. 428/610 |
| 5,260,137 | * | 11/1993 | Rosenthal et al. ............ 428/614 |
| 5,403,411 | | 4/1995 | Smith et al. ................. 148/514 |
| 5,429,877 | | 7/1995 | Eylon .......................... 428/586 |
| 5,460,774 | | 10/1995 | Bachelet ...................... 419/5 |

* cited by examiner

FIG. 1

| MATERIAL | YIELD STRENGTH x 10³ PSI | DENSITY LBS / IN³ | SPECIFIC STRENGTH x10³ INCH-LBS. |
|---|---|---|---|
| 301 STAINLESS STEEL | 130 | .286 | 455 |
| A1 7075 T6 | 65 | .101 | 644 |
| T1 6A1 4V | 120 | .163 | 736 |
| 5 LAYER BETA Ti/CARBON COMPOSITE | 305 | .101 | 3,040 |

FIG. 2

| MATERIAL | FASTENER PULL THROUGH (a) | COMPRESSION AFTER IMPACT (b) |
|---|---|---|
| AS4 3501-6 QUASI-ISOTROPIC | 67 KSI | 22-32 KSI |
| TITANIUM/CARBON COMPOSITE | 125 KSI | 60 KSI |

(a) DOUBLE LAB SHEAR OR PIN BEARING; FASTENER DIAMETER = 0.3125 IN (b) .25" SAMPLE AT 1500 IN-LB/IN; HERCULES® DATA

BETA TITANIUM-COMPOSITE LAMINATE

CROSS-REFERENCE TO RELATED APPLICATIONS

The present Application is a continuation-in-part of U.S. patent application Ser. No. 08/982,779, filed Dec. 2, 1997, entitled "Sports Bat Having Multilayered Shell," now U.S. Pat. No. 5,906,550, issued May 25, 1999; which is a continuation-in-part of U.S. patent application Ser. No. 08/690,801, filed Aug. 1, 1996, entitled "Method of Preparing Beta Titanium-fiber Reinforced Composite Laminates," now U.S. Pat. No. 5,693,157, issued on Dec. 2, 1997; which is a divisional of U.S. patent application Ser. No. 08/588,868, filed Jan. 19, 1996, entitled "Beta Titanium-fiber Reinforced Composite Laminates," now U.S. Pat. No. 5,578,384, issued Nov. 26, 1996; which is a continuation of U.S. patent application Ser. No. 08/568,530, filed Dec. 7, 1995, entitled "Carbon-Titanium Composites," now U.S. Pat. No. 5,733,390, issued on Mar. 31, 1998; which is a continuation of U.S. patent application Ser. No. 08/139,091, filed Oct. 18, 1993, entitled "Titanium And Graphite Fiber Composites," now abandoned; the contents of each of which are incorporated herein by reference in their entirety.

BACKGROUND

Aircraft primary structures are predominately made from non-composite metals. However, the aerospace industry has been increasingly using light weight, advanced composite materials in place of metals to produce primary structures because of the high specific strength of advanced composites materials. Nevertheless, advanced composite materials have not entirely replaced metals in primary structures because advanced composites are more sensitive to damage, have lower bearing strength, and are more susceptible to fastener failure than metals.

Several improved composites have been designed, including Arall, as disclosed in U.S. Pat. No. 4,500,589, and Glair, as disclosed in U.S. Pat. No. 5,039,571. Disadvantageously, however, the layers of both Arall and Glair have a mismatch of the ratio between their modulus of elasticity and their yield strength.

For example, Arall is a composite of aluminum skins adhesively bonded to a core of Aramid fiber/epoxy composite. The Aramid fiber of Arall has a unidirectional yield strength of about 172,000 psi and a modulus of $12.2 \times 10^6$ psi, while the aluminum layer has a yield strength of 50,000 psi and modulus of $10.0 \times 10^6$ psi. Thus, stressing the Aramid fiber layer to its maximum yield strength would stress the aluminum layer to 141,000 psi, which is well above the maximum limit for the aluminum layer. Conversely, stressing the aluminum layer to its maximum yield strength of 50,000 psi stresses the Aramid fiber layer to 61,000 psi, which is well below the maximum limit for the Aramid fiber layer. Thus, the strength of the Aramid fiber layer is underutilized. Similarly, the layers of composite laminates of standard alpha-beta alloys of titanium, such as Ti6Al-4V, and carbon fiber composites have a mismatch of the ratio between their modulus of elasticity and their yield strength.

The aerospace industry has not used the newer beta alloys of titanium, such as TIMETAL® 15-3 (Ti-15V-3Cr-3Sn-3Al) and TIMETAL® 21s (Ti-15Mo-3Al-3Nb), for composite laminates even though these beta alloys of titanium have higher strength and a lower modulus of elasticity because commonly used adhesives will not stick adequately to the titanium oxide surface layer present on these alloys. While methods have been developed to bond the standard alpha-beta alloys of titanium to carbon fiber composites, these methods do not work with the beta alloys of titanium.

Therefore, there is a need for improved composite laminates for the primary structures of aircraft which utilize the full strength of each layer. Further, there is a need for a method of preparing these composite laminates.

SUMMARY

According to one embodiment of the present invention, there is provided a method of preparing a beta titanium-composite laminate. The method comprises providing a first layer of beta titanium alloy having a yield strength to modulus of elasticity ratio and providing a first layer of composite having a yield strength to modulus of elasticity ratio. Then, the first layer of beta titanium alloy is adhered to the first layer of composite, thereby forming a beta titanium-composite laminate. The yield strength to modulus of elasticity ratio of the first layer of beta titanium alloy matches the strength to modulus of elasticity ratio of the first layer of composite such that the first layer of beta titanium alloy will reach its stress limit and the first layer of composite will reach its stress limits at about the same total strain.

In one embodiment, the beta titanium alloy provided is selected from the group consisting of (Ti-15V-3Cr-3Sn-3Al) and (Ti-15Mo-3Al-3Nb). In a preferred embodiment, the composite provided is a carbon fiber/epoxy composite. In another preferred embodiment, the composite provided is an S2-glass/epoxy composite.

In one embodiment, adhering comprises applying an adhesive to the beta titanium alloy. In another embodiment, adhering comprises bonding the composite by heating the composite.

In a particularly preferred embodiment, the yield strength to modulus of elasticity ratio of the first layer of beta titanium alloy is between about 5% of the strength to modulus of elasticity ratio of the first layer of composite. In another particularly preferred embodiment, the method additionally comprises cold reducing the beta titanium alloy before adhering. In yet another particularly preferred embodiment, the method additionally comprising heating the beta titanium alloy at a temperature for a time to produce an aged beta titanium alloy before adhering, such as a temperature of approximately 950° F. and a time of approximately 8 hours.

In a particularly preferred embodiment, the method additionally comprises cold reducing the beta titanium alloy and then aging the beta titanium alloy before adhering. In another particularly preferred embodiment, the method additionally comprises coating the surface of the beta titanium alloy with a metal selected from the group consisting of platinum and the functional equivalent of platinum as a coating material, to produce a coated titanium alloy before adhering. In another particularly preferred embodiment, the method additionally comprises abrading the surface of the beta titanium alloy before adhering.

In another particularly preferred embodiment, the method additionally comprises, after adhering, providing a second layer of beta titanium alloy having a yield strength to modulus of elasticity ratio and adhering the second layer of beta titanium alloy to the beta titanium-composite laminate, where the yield strength to modulus of elasticity ratio of the second layer of beta titanium alloy matches the strength to modulus of elasticity ratio of the first layer of composite such that the second layer of beta titanium alloy will reach its stress limit and the first layer of composite will reach its stress limits at about the same total strain. In yet another particularly preferred embodiment, the method additionally comprises, after adhering, providing a second layer of composite having a strength to modulus of elasticity ratio and adhering the second layer of composite to the beta titanium-composite laminate, where the strength to modulus of elasticity ratio of the second layer of composite matches the yield strength to modulus of elasticity ratio of the first layer of beta titanium alloy such that the second layer of composite will reach its stress limit and the first layer of beta titanium alloy will reach its stress limits at about the same total strain.

The present invention also includes a method of making an airplane part comprises preparing a beta titanium-composite laminate according to the present invention and incorporating the beta titanium-composite laminate into an airplane part. The present invention also includes a method of making an airplane comprising preparing an airplane part according to the present invention and incorporating the part into an airplane. The airplane part can be selected from the group consisting of airplane skin, a spar, a plate and a tube.

In a preferred embodiment, the present invention includes a beta titanium-composite laminate produced according to a method of the present invention.

In another preferred embodiment, the present invention includes a beta titanium-composite laminate comprising a first layer of beta titanium alloy having a yield strength to modulus of elasticity ratio, and a first layer of composite having a strength to modulus of elasticity ratio adhered to the first layer of beta titanium alloy. The yield strength to modulus of elasticity ratio of the first layer of beta titanium alloy matches the strength to modulus of elasticity ratio of the first layer of composite such that the first layer of beta titanium alloy will reach its stress limit and the first layer of composite will reach its stress limits at about the same total strain. For example, the yield strength to modulus of elasticity ratio of the first layer of beta titanium alloy can be between about 5% of the strength to modulus of elasticity ratio of the first layer of composite. The beta titanium-composite laminate can additionally comprises a layer of platinum between the first layer of beta titanium alloy and the first layer of composite.

In another particularly preferred embodiment, the beta titanium-composite laminate can additionally comprising a second layer of beta titanium alloy having a yield strength to modulus of elasticity ratio adhered to the first layer of composite. The yield strength to modulus of elasticity ratio of the second layer of beta titanium alloy matches the strength to modulus of elasticity ratio of the first layer of composite such that the second layer of beta titanium alloy will reach its stress limit and the first layer of composite will reach its stress limits at about the same total strain. The beta titanium-composite laminate can additionally comprising a layer of platinum between the second layer of beta titanium alloy and the first layer of composite.

In another particularly preferred embodiment, the beta titanium-composite laminate can additionally comprises a second layer of composite having a yield strength to modulus of elasticity ratio adhered to the first layer of beta titanium alloy. The yield strength to modulus of elasticity ratio of the second layer of composite matches the strength to modulus of elasticity ratio of the first layer of beta titanium alloy such that the second layer of composite will reach its stress limit and the first layer of beta titanium alloy will reach its stress limits at about the same total strain. For example, the beta titanium-composite laminate of claim 34, where the yield strength to modulus of elasticity ratio of the second layer of beta titanium alloy is between about 5% of the strength to modulus of elasticity ratio of the first layer of composite. The beta titanium-composite laminate can additionally comprising a layer of platinum between the first layer of beta titanium alloy and the second layer of composite.

In a particularly preferred embodiment, the present invention includes an airplane or an airplane part comprising a beta titanium-composite laminate according to the present invention. The present invention further includes an airplane comprising an airplane part according to the present invention.

FIGURES

These features, aspects and advantages of the present invention will become better understood with regard to the following description, appended claims and the accompanying figures where:

FIG. 1 shows a chart comparing the yield strength, density and specific strength for materials known in the prior art with a five layer titanium-carbon fiber composite laminate according to the present invention;

FIG. 2 shows a chart comparing the damage sensitivity of an all-carbon fiber composite with a titanium-carbon fiber composite laminate according to the present invention;

DESCRIPTION

Figure 3:
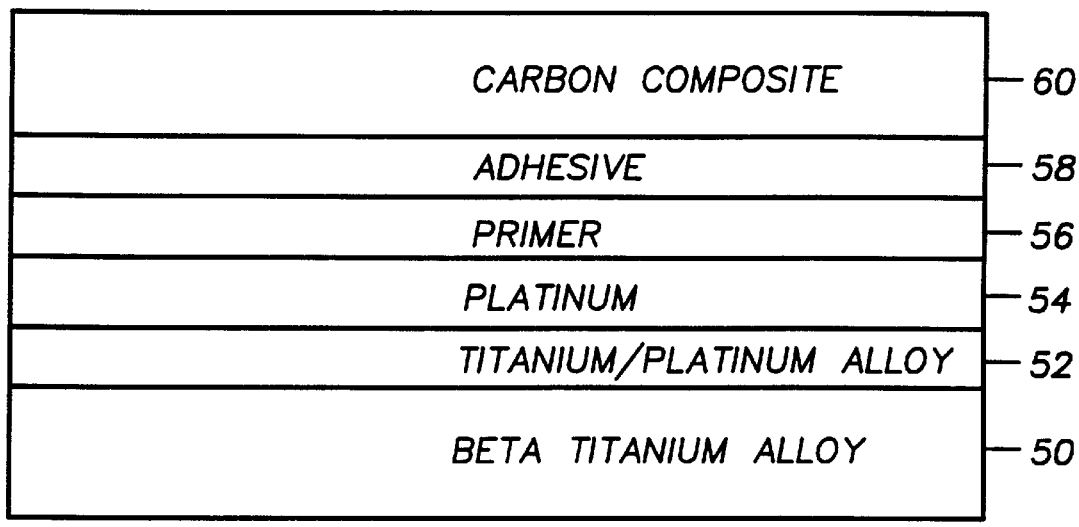
FIG. 3 shows a diagram of a cross-sectional view of a titanium/adhesive-carbon bond according to the present invention.

The present invention addresses a need in the aerospace industry for composites materials which can be used to reduce the weight of primary structures incorporated into aircraft while providing superior strength and damage resistance of the structures. In one embodiment, the present invention includes a composite laminate of at least one layer of beta titanium alloy that is bonded to at least one layer of a high-strength carbon (graphite) fiber/epoxy to produce a beta titanium-carbon fiber composite laminate. This composite laminate maintains the advantages of each material without sacrificing the load carrying ability or either layer by matching the strength to modulus of elasticity ratio between the at least one beta titanium alloy layer and the at least one carbon fiber layer.

In a preferred embodiment, the beta titanium-carbon fiber composite laminate according to the present invention includes at least one beta titanium layer that is made of TIMETAL® 15-3 (Ti-15V-3Cr-3Sn-3Al) (available from Titanium Metals Corporation, Denver, Co., US) and the at least one carbon fiber/epoxy composite layer that is made of Hercules® carbon fiber AS4. The beta titanium layer of TIMETAL® 15-3 is cold reduced from the solution treated condition by 50% which gives it a tensile strength of 173,000 psi and a modulus of elasticity of $12.4 \times 10^6$ psi (a yield strength to modulus of elasticity ratio of 0.01395). The carbon composite layer has a unidirectional tensile strength of 220,000 psi and a modulus of elasticity of $16\times10^6$ psi (a strength to modulus of elasticity ratio of 0.01375). Thus, the yield strength to modulus of elasticity ratio of the beta titanium alloy layer matches the strength to modulus of elasticity ratio of the carbon composite layer within about 1.5%. Under the same total strain, the beta titanium layer will be stressed to 170,000 psi and the carbon layer will be stressed to 220,000 psi. Therefore, each layer of the beta titanium-carbon fiber composite laminate will reach its stress limit at about the same total strain giving the beta titanium-carbon fiber composite laminate a superior specific strength without under-utilizing either layer.

The 50% cold reduction of the titanium layer in the above embodiment is made, for example, by rolling a 0.020 inches thick strip of titanium alloy in the solution treated condition to a thickness of 0.010 inches. Cold reductions of greater or lesser percentages can also be made in order to match the strength to modulus of elasticity ratio of the titanium alloy to the strength to modulus of elasticity ratio of the composite layer.

In another embodiment, the beta titanium-carbon fiber composite laminate according to the present invention includes at least one beta titanium layer and at least one carbon fiber/epoxy composite layer of Hercules® fiber IM8. The beta titanium alloy is aged at 950° F. for 8 hours to have a tensile strength of 224,000 psi and a modulus of elasticity of $16.3\times10^6$ psi (a yield strength to modulus of elasticity ratio of 0.01374). The at least one layer of Hercules® IM8 fiber has a unidirectional tensile strength of approximately 380,000 psi and a modulus of elasticity of $27\times10^6$ psi (a strength to modulus of elasticity ratio of 0.01407). Thus, the yield strength to modulus of elasticity ratio of the layer of beta titanium alloy matches the strength to modulus of elasticity ratio of the layer of carbon composite within about 2.4%. Under the same total strain conditions, the beta titanium layer will be stressed to 224,000 psi and the carbon layer will be stressed to 371,000 psi. Therefore, each layer of the beta titanium-carbon fiber composite laminate will reach its stress limit at about the same total strain giving the beta titanium-carbon fiber composite laminate a superior specific strength without underutilizing either layer.

Composite laminates of the present invention can also be made using other materials such as $S_2$-Glass and boron instead of carbon composite. For example, boron in compression has a strength of 400,000 psi and a modulus of $30\times10^6$ psi (a strength to modulus of elasticity ratio of 0.01333). When boron is combined with at least one layer of cold reduced TIMETAL® 15-3, similar to the composite laminates disclosed above, stressing the boron layer to 400,000 psi will stress the titanium layer to 217,000 psi. Thus, the yield strength to modulus of elasticity ratio of the layer of beta titanium alloy matches the strength to modulus of elasticity ratio of the layer of boron within about 4.6%.

Further, composites of the present invention can also be made using other materials such as aluminum or steel alloys instead of beta titanium alloys. However, beta titanium alloys are preferred in composites of the present invention because of the high specific strength of the beta titanium alloy and carbon fiber composites. For example, in an aluminum-carbon fiber composite laminate composed of 7075-T6 aluminum alloy and high-modulus carbon fiber/epoxy composite, the carbon layer will have a tensile strength of 122,000 psi and a modulus of $27.5\times10^6$ and will stress the aluminum layer to 46,000 psi, which is less than the stress limit of the aluminum layer. Therefore, each layer of the aluminum-carbon fiber composite laminate will not reach its stress limit at about the same total strain.

Similarly, in a steel-carbon fiber composite laminate of 301 stainless steel and high-modulus carbon fiber/epoxy composite, the carbon layer will have a tensile strength of 122,000 psi and a modulus of $27.5\times10^6$. At the maximum tensile strength of the carbon layer, the steel layer will stress to 133,000 psi, which is less than the stress limit of 301 stainless steel. Therefore, each layer of the steel-carbon fiber composite laminate will not reach its stress limit at about the same total strain.

According to one embodiment of the present invention, there is provided a method of making a beta titanium-carbon fiber composite laminate. In one embodiment, the method includes forming a basic shape from a titanium alloy such as TIMETAL® 15-3 in the solution treated condition. The shape is then cleaned by placing the titanium in a hot caustic solution followed by a hydrofluoric/nitric acid pickle.

Next, a surface that is to be bonded to a composite layer is sandblasted with an aluminum oxide grit 100 mesh under approximately 40 psi of air pressure. This sandblasting creates an irregular surface with a surface area that is increased by approximately 100% by the sandblasting.

The surface is then electrolytically coated with a metallic coating such as a thin layer of platinum or a functional equivalent material such as nickel. Next, the shape is aged to its final strength which simultaneously bonds the coating to the surface of the beta titanium. Aging the coated titanium causes the surface oxide of the titanium to go into solution, which in turn allows the surface coating to chemically bond to the titanium causing an alloy of titanium and platinum to form at the interface. The time and temperature of the aging process is selected by empirical testing to produce a beta titanium layer which matching the strength to modulus of elasticity ratio between the beta titanium alloy layer and the carbon fiber layer, while allowing the surface of the beta titanium to partly absorb the surface coating. For example, the titanium can be aged at approximately 950° F. for 8 hours.

Next, the shapes are cleaned and primed with a standard primer such as BAR 127, and then the carbon composite layer is adhesively bonded to the primed side of the beta titanium layer with an adhesive such as AF163-2. The surfaces are selectively strengthened by placing carbon fabric or unidirectional pregreg tape in an amount and orientation that will yield the required strength needed for the part being produced without adding unnecessary weight. The part is then hot cured in a standard way either in a press or autoclave. The resulting part has a much higher specific strength and, thus, a lower weight for a given strength than a part produced by prior art methods.

Referring now to FIG. 1, there is shown a chart comparing the yield strength, density and specific strength for materials known in the prior art with a five layer titanium-carbon fiber composite laminate according to the present invention having three layers of 0.010 inches thick TIMETAL® 15-3 and two layers of 0.030 inches thick unidirectional Hercules® fiber IM8. As can be seen, the specific strength of the beta titanium-carbon fiber composite laminate of the present invention is significantly greater than the prior art materials.

The specific strength of an all-carbon composite structure can be even higher than the specific strength of a titanium-carbon fiber composite laminate. However, all-carbon fiber composites are disadvantageously more sensitive to damage compared to titanium-carbon fiber composite laminates. For example, referring now to FIG. 2, there is shown a chart comparing the damage sensitivity of an all-carbon fiber composite (AS4 3501-6 Quasi-Isotropic), top, with a titanium-carbon fiber composite laminate according to the present invention, bottom, in two tests of damage sensitivity. As can be seen, the titanium-carbon fiber composite laminate was approximately twice as strong as the all-carbon fiber composite in both tests.

To make a part with a beta titanium layer adhered to a carbon composite, according to the present invention and as shown in FIG. 3, the titanium has to be prepared so that the adhesive will effectively bond to the titanium. Normally, the titanium oxide coating on the surface of beta titanium alloy will not bond effectively to an adhesive. This is evidenced by the industry standard wedge crack test. In this test, a wedge is inserted between the strips of titanium, cracking the adhesive. The strips of titanium, with the inserted wedge and cracked adhesive, are then placed in a humidity chamber. This leaves a strain on the remaining adhesive/titanium bond line under an elevated temperature and high humidity conditions (140° F., 95% relative humidity). Using the industry standard surface preparation methods, such as anodizing, the adhesive will completely slick off beta titanium alloys.

Referring now to FIG. 3, there is shown a diagram of a cross-sectional view of a titanium/adhesive-carbon bond according to the present invention after the carbon has been bonded and cured with the titanium. The beta titanium alloy layer 50 has been sandblasted and then, coated with a platinum layer 54 on one side. A standard surface treatment of the carbon composite 60 can be used when bonding or co-curing to the primered titanium surface. During the aging process, the titanium becomes chemically active and starts to absorb the platinum which creates a titanium platinum alloy layer 52 that serves to bond the platinum coating 54 to the titanium layer 50. Then, the platinum layer 54 is coated with a primer layer 56, which in turn is coated with adhesive layer 58. Next, the carbon layer 60 is bonded to the adhesive layer 58 in the standard manner, such as heating the carbon layer 60 and adhesive layer 58 to 350° F. for approximately one hour. Information on suitable temperatures and pressures for each adhesive and carbon fiber composite are generally available through the manufacturer of the carbon fiber composites.

Aircraft parts according to the present invention can be made having suitable strength and increased damage tolerance while weighting approximately 50–75% less. For example, an airplane skin made of a titanium-carbon fiber composite laminate according to the present invention, will have a reduced tendency to tear apart in the event of an explosion or gun shot through the skin. Additionally, beta titanium-carbon fiber composite laminate sheets according to the present invention have a stronger joint than sheets of pure carbon epoxy in which fasteners tend to pull through the carbon. See, for example, FIG. 2.

Figure 4:
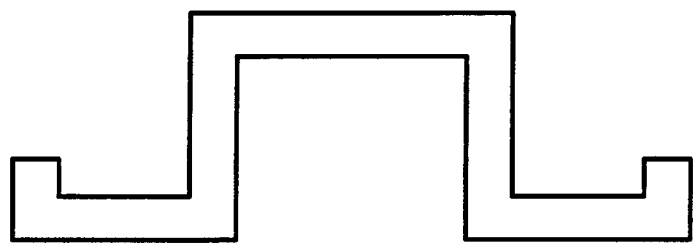
FIG. 4 shows a cross-sectional view of a prior art spar made of aluminum alloy.
Figure 5:
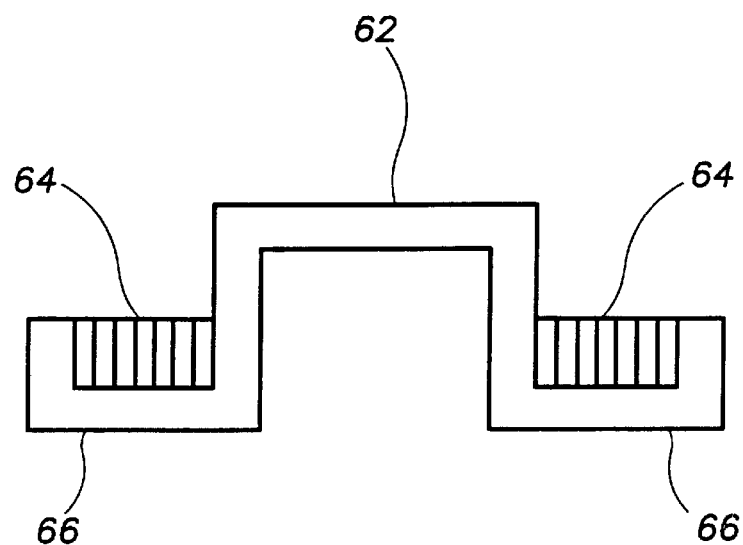
FIG. 5 shows a cross-sectional view of a titanium-carbon fiber composite laminate spar according to the present invention.

The methods and composites of the present invention can be used to make several parts used in aircraft, including spars, plates and tubes. For example, referring now to FIG. 4, there is shown a cross-sectional view of a prior art spar made of 0.073 inches thick 7075-T6 aluminum alloy. This spar weighs 0.46 lbs./linear foot. Referring now to FIG. 5, there is shown by comparison a cross-sectional view of a titanium-carbon fiber composite laminate spar according to the present invention made with a TIMETAL® 15-3 shell 62 reinforced with carbon/epoxy strips 64 bonded to the flange sections 66 to form a composite laminate structure. This composite laminate spar has a strength and stiffness that is similar to the prior art spar shown in FIG. 4, but the composite laminate spar weighs only 0.20 lbs./linear foot, therefore offering a 50% weight reduction.

Figure 6:
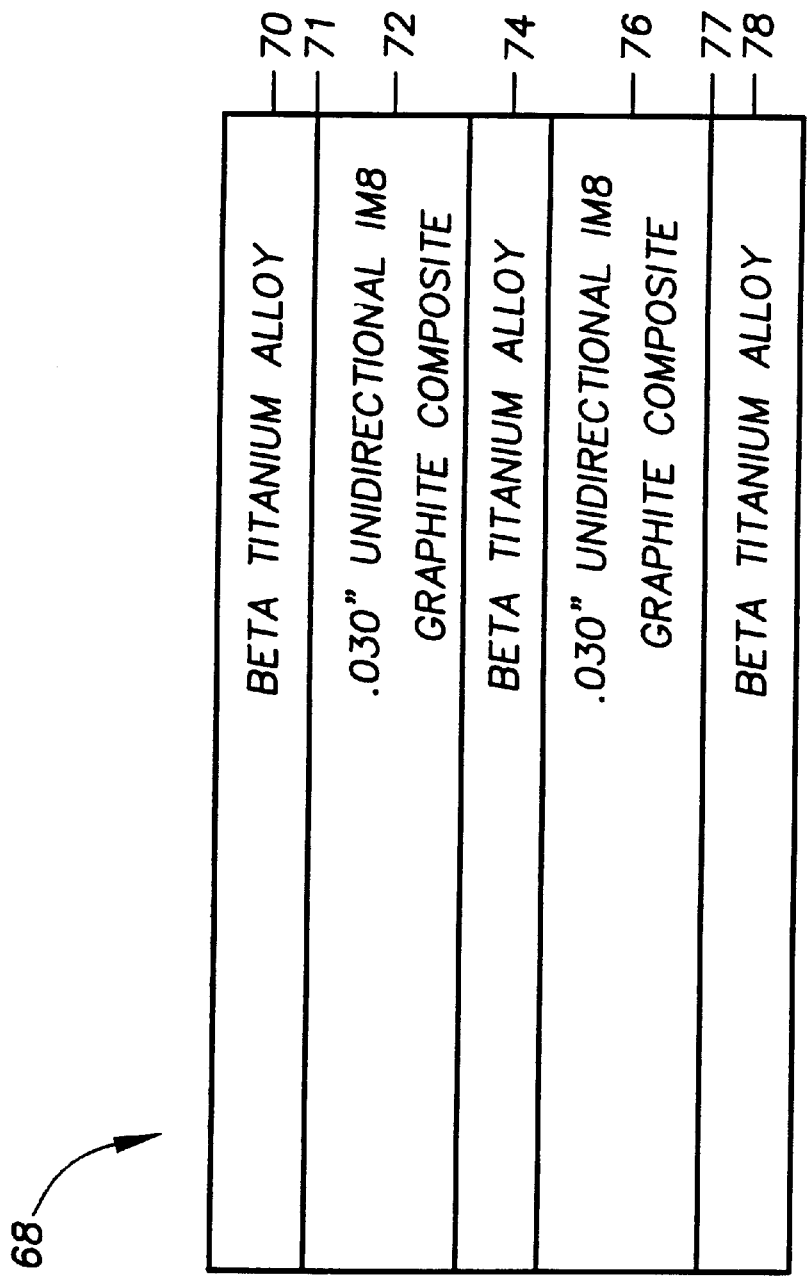
FIG. 6 shows a cross-sectional view of a five layer titanium-carbon fiber composite laminate plate according to the present invention.

Similarly, plates using in aircraft can be constructed from the titanium-carbon fiber composite laminates of the present invention where the carbon composite layer or layers are in an isotropic pattern or in a unidirectional pattern, as suitable for the anticipated stress on the plate. For example, referring now to FIG. 6, there is shown a cross-sectional view of a five layer titanium-carbon fiber composite laminate plate according to the present invention for use in an aircraft. The plate 68 is 0.090 inches thick and has unidirectional tensile strength of over 300,000 psi. Layers 70, 74 and 78 are beta titanium alloy 0.010 inches thick. Layers 72 and 76 are unidirectional graphite composite. The layers 70 and 78 have one side of their surfaces, 71 and 77 respectively, prepared by sandblasting, platinum coating and priming before bonding to their respective graphite composite layers 72 and 76, respectively. The beta titanium alloy layer 74 has both its surfaces prepared by the above method before bonding to the graphite composite layers 72 and 76.

The yield strength, density and specific strength of the plate 68 are compared against prior art materials in FIG. 1. As can be seen in FIG. 1, the beta titanium alloy/unidirectional graphite composite has the highest specific strength, 3,040,000 inch-lbs. per inch in the L direction, which is superior to other materials commonly used for aerospace part construction. This high specific strength allows reduction in the overall weight by approximately 60% for airplane skin. By comparison, an aluminum plate would have to be 4½ times as thick and 4½ times as heavy to have the same specific strength.

Although the present invention has been described in considerable detail with reference to certain preferred embodiments, other embodiments are possible, as will be understood by those with skill in the art with reference to this disclosure. Therefore, the spirit and scope of the appended claims should not be limited to the description of the preferred embodiments.

What is claimed:

1. A method of preparing a beta titanium-composite laminate comprising:
    (a) providing a first layer of beta titanium alloy having a yield strength to modulus of elasticity ratio;
    (b) providing a first layer of composite having a yield strength to modulus of elasticity ratio; and
    (c) adhering the first layer of beta titanium alloy to the first layer of composite, thereby forming a beta titanium-composite laminate;
    where the yield strength to modulus of elasticity ratio of the first layer of beta titanium alloy matches the strength to modulus of elasticity ratio of the first layer of composite such that the first layer of beta titanium alloy will reach its stress limit and the first layer of composite will reach its stress limits at about the same total strain.

2. The method of claim 1, where the beta titanium alloy provided is selected from the group consisting of (Ti-15V-3Cr-3Sn-3Al) and (Ti-15Mo-3Al-3Nb).

3. The method of claim 1, where the composite provided is a carbon fiber/epoxy composite.

4. The method of claim 1, where the composite provided is an S2-glass/epoxy composite.

5. The method of claim 1, where adhering comprises applying an adhesive to the beta titanium alloy.

6. The method of claim 1, where adhering comprises bonding the composite by heating the composite.

7. The method of claim 1, where the yield strength to modulus of elasticity ratio of the first layer of beta titanium alloy is between about 5% of the strength to modulus of elasticity ratio of the first layer of composite.

8. The method of claim 1, additionally comprising cold reducing the beta titanium alloy before adhering.

9. The method of claim 1, additionally comprising heating the beta titanium alloy at a temperature for a time to produce an aged beta titanium alloy before adhering.

10. The method of claim 9, where the temperature is approximately 950° F. and the time is approximately 8 hours.

11. The method of claim 1, additionally comprising cold reducing the beta titanium alloy and then aging the beta titanium alloy before adhering.

12. The method of claim 1, additionally comprising coating the surface of the beta titanium alloy with a metal selected from the group consisting of platinum and the functional equivalent of platinum as a coating material, to produce a coated titanium alloy before adhering.

13. The method of claim 1, additionally comprising abrading the surface of the beta titanium alloy before adhering.

14. The method of claim 1, additionally comprising, after adhering, providing a second layer of beta titanium alloy having a yield strength to modulus of elasticity ratio and adhering the second layer of beta titanium alloy to the beta titanium-composite laminate, where the yield strength to modulus of elasticity ratio of the second layer of beta titanium alloy matches the strength to modulus of elasticity ratio of the first layer of composite such that the second layer of beta titanium alloy will reach its stress limit and the first layer of composite will reach its stress limits at about the same total strain.

15. The method of claim 1, additionally comprising, after adhering, providing a second layer of composite having a strength to modulus of elasticity ratio and adhering the second layer of composite to the beta titanium-composite laminate, where the strength to modulus of elasticity ratio of the second layer of composite matches the yield strength to modulus of elasticity ratio of the first layer of beta titanium alloy such that the second layer of composite will reach its stress limit and the first layer of beta titanium alloy will reach its stress limits at about the same total strain.

16. A method of making an airplane part, comprising:
(a) preparing a beta titanium-composite laminate according to the method of claim 1; and
(b) incorporating the beta titanium-composite laminate into an airplane part.

17. The method of making an airplane part of claim 16, where the airplane part is selected from the group consisting of airplane skin, a spar, a plate and a tube.

18. A method of making an airplane, comprising:
(a) preparing an airplane part according to the method of claim 16; and
(b) incorporating the part into an airplane.

19. A method of making an airplane, comprising:
(a) providing a beta titanium-composite laminate according to the method of claim 1;
(b) utilizing the beta titanium-composite laminate to produce an airplane part; and
(c) incorporating the part into an airplane part.

20. The method of making an airplane of claim 19, where the air plane part produced is selected from the group consisting of airplane skin, a spar, a plate and a tube.

21. A beta titanium-composite laminate produced according to claim 1.

22. A beta titanium-composite laminate comprising a first layer of beta titanium alloy having a yield strength to modulus of elasticity ratio, and a first layer of composite having a strength to modulus of elasticity ratio adhered to the first layer of beta titanium alloy;
where the yield strength to modulus of elasticity ratio of the first layer of beta titanium alloy matches the strength to modulus of elasticity ratio of the first layer of composite such that the first layer of beta titanium alloy will reach its stress limit and the first layer of composite will reach its stress limits at about the same total strain.

23. The beta titanium-composite laminate of claim 22, where the yield strength to modulus of elasticity ratio of the first layer of beta titanium alloy is between about 5% of the strength to modulus of elasticity ratio of the first layer of composite.

24. The beta titanium-composite laminate of claim 22, additionally comprising a layer of platinum between the first layer of beta titanium alloy and the first layer of composite.

25. The beta titanium-composite laminate of claim 22, additionally comprising a second layer of beta titanium alloy having a yield strength to modulus of elasticity ratio adhered to the first layer of composite;
where the yield strength to modulus of elasticity ratio of the second layer of beta titanium alloy matches the strength to modulus of elasticity ratio of the first layer of composite such that the second layer of beta titanium alloy will reach its stress limit and the first layer of composite will reach its stress limits at about the same total strain.

26. The beta titanium-composite laminate of claim 25, where the yield strength to modulus of elasticity ratio of the second layer of beta titanium alloy is between about 5% of the strength to modulus of elasticity ratio of the first layer of composite.

27. The beta titanium-composite laminate of claim 25, additionally comprising a layer of platinum between the second layer of beta titanium alloy and the first layer of composite.

28. The beta titanium-composite laminate of claim 25, additionally comprising a second layer of composite having a yield strength to modulus of elasticity ratio adhered to the first layer of beta titanium alloy;
where the yield strength to modulus of elasticity ratio of the second layer of composite matches the strength to modulus of elasticity ratio of the first layer of beta titanium alloy such that the second layer of composite will reach its stress limit and the first layer of beta titanium alloy will reach its stress limits at about the same total strain.

29. The beta titanium-composite laminate of claim 25, additionally comprising a layer of platinum between the first layer of beta titanium alloy and the second layer of composite.

30. An airplane part comprising the beta titanium-composite laminate of claim 22.

31. An airplane comprising the beta titanium-composite laminate of claim 22.

32. An airplane part comprising the beta titanium-composite laminate of claim 25.

33. An airplane comprising the beta titanium-composite laminate of claim 25.

* * * * *